(12) United States Patent
Wienhold

(10) Patent No.: US 9,873,155 B1
(45) Date of Patent: Jan. 23, 2018

(54) QUICK CHANGE TOOL BIT HOLDER FOR ROUND SHAFTS

(75) Inventor: James L. Wienhold, Minneapolis, MN (US)

(73) Assignee: INSTY-BIT, LLC, Minneapolis, MN (US)

( * ) Notice: Subject to any disclaimer, the term of this patent is extended or adjusted under 35 U.S.C. 154(b) by 2265 days.

(21) Appl. No.: 12/765,327

(22) Filed: Apr. 22, 2010

Related U.S. Application Data

(60) Provisional application No. 61/214,326, filed on Apr. 22, 2009.

(51) Int. Cl.
*B23B 31/107* (2006.01)
*B23B 31/22* (2006.01)

(52) U.S. Cl.
CPC .......... *B23B 31/1071* (2013.01); *B23B 31/22* (2013.01); *Y10T 279/17145* (2015.01); *Y10T 279/17196* (2015.01); *Y10T 279/17752* (2015.01)

(58) Field of Classification Search
CPC ..... Y10T 279/17752; Y10T 279/17145; Y10T 279/17196; B23B 31/1071; B23B 31/22
USPC ...... 279/22, 29, 30, 74–76, 82, 905, 904, 37
See application file for complete search history.

(56) References Cited

U.S. PATENT DOCUMENTS

| | | | |
|---|---|---|---|
| 2,135,861 A | 11/1938 | Thompson | |
| 3,103,367 A * | 9/1963 | Peck | 279/76 |
| 4,577,875 A | 3/1986 | Miyakawa | |
| 4,900,202 A | 2/1990 | Wienhold | |
| 5,013,194 A | 5/1991 | Wienhold | |
| 5,062,749 A | 11/1991 | Sheets | |
| 5,417,527 A | 5/1995 | Wienhold | |
| 5,466,101 A | 11/1995 | Meyen | |
| 5,470,180 A | 11/1995 | Jore | |
| 5,722,805 A | 3/1998 | Giffin | |
| 5,779,404 A | 7/1998 | Jore | |
| 6,176,654 B1 | 1/2001 | Jore | |
| 6,270,085 B1 | 8/2001 | Chen et al. | |

(Continued)

FOREIGN PATENT DOCUMENTS

WO 02/064295 8/2002
WO WO 2005089989 A1 * 9/2005

OTHER PUBLICATIONS

Supplementary European Search Report from European Patent Application No. 05 72 5716, dated Jun. 12, 2009, 2 pages.

(Continued)

*Primary Examiner* — Sunil K Singh
*Assistant Examiner* — Paul M Janeski
(74) *Attorney, Agent, or Firm* — James L. Young; Westman, Champlin & Koehler, P.A.

(57) ABSTRACT

An apparatus is disclosed for holding the shaft of an object, wherein the shaft rotates in a first working direction. The apparatus includes a bore, a first ball slot in communication with the bore, a first ball disposed within the first ball slot, and a spring. The bore has a longitudinal axis, and the shaft is inserted into the bore in an insertion direction. The first ball slot is in communication with the bore and includes a ramp. The first ball slot has a first axis that is angularly offset from the longitudinal axis at an acute angle between the insertion direction and the first working direction. Upon insertion of the shaft into the bore, the shaft contacts the ball and causes it to move along the ramp within the ball slot, thereby compressing the spring by a first amount.

18 Claims, 17 Drawing Sheets

(56) References Cited

U.S. PATENT DOCUMENTS

| | | | |
|---|---|---|---|
| 6,276,065 B1 * | 8/2001 | Osada et al. | 30/392 |
| 6,302,408 B1 | 10/2001 | Zierpka | |
| 6,325,393 B1 | 12/2001 | Chen et al. | |
| 6,347,914 B1 | 2/2002 | Boyle et al. | |
| 6,394,715 B1 | 5/2002 | Boyle et al. | |
| 6,457,916 B2 | 10/2002 | Wienhold | |
| 6,561,523 B1 | 5/2003 | Wienhold | |
| 6,616,149 B1 | 9/2003 | Pjevach et al. | |
| 6,695,321 B2 | 2/2004 | Bedi | |
| 6,722,667 B2 | 4/2004 | Cantlon | |
| 6,874,791 B2 | 4/2005 | Chen et al. | |
| 6,966,562 B1 | 11/2005 | Wienhold | |
| 7,665,216 B2 * | 2/2010 | Yasheng | 30/392 |
| 7,896,355 B2 * | 3/2011 | Wienhold | 279/22 |
| 8,292,304 B2 * | 10/2012 | Wienhold | 279/22 |
| 8,308,168 B2 * | 11/2012 | Nash | 279/74 |
| 2004/0013485 A1 | 1/2004 | Zierpka | |
| 2004/0111804 A1 | 6/2004 | Fan-Chiang | |

OTHER PUBLICATIONS

European Communication from EP Application No. 05 725 716.4 dated May 18, 2010, 4 pages.

* cited by examiner

QUICK CHANGE TOOL BIT HOLDER FOR ROUND SHAFTS

CROSS-REFERENCE TO RELATED APPLICATION

The present application is based on and claims the benefit of U.S. provisional patent application Ser. No. 61/214,326, filed Apr. 22, 2009, by James L. Wienhold, entitled "Quick-Change Holder for Round Shafts," the content of which is hereby incorporated by reference in its entirety.

BACKGROUND

The marketplace currently offers two primary types of drill chuck mechanisms for retaining drilling and driving tool bits. The traditional or "incremental" design typically consists of a mechanism that houses three adjustable jaws that protrude at an angle into a bore. An external sleeve is coupled to the jaws via internal gear teeth. When a tool is inserted into the bore, the sleeve is rotated by a user. As the sleeve is rotated in one direction, the jaws are forced towards the center of the bore to clamp a tool bit. When the sleeve is rotated in the opposite direction, the jaws are opened. This chuck style is able to accommodate a variety of tool sizes and shapes; however, changing a tool bit takes time.

It has long been recognized that the ability to quickly change tool bits in the spindle of a power tool is an advantageous feature. Construction workers and carpenters regularly change drill bits in numerous types of construction projects, often when the worker is in a position where it is difficult to change the bit, such as on a ladder. To change a drill bit, the carpenter must loosen the chuck, remove the old bit from the chuck, insert the new bit and tighten the chuck.

A second, more recent approach to chuck design allows for tools to be exchanged in a "quick-change" manner. Examples of quick-change mechanisms such as this are explained in U.S. Pat. Nos. 4,900,202 and 5,013,194, both of which are incorporated by reference herein. Quick-change chucks typically require the use of tools that have shafts or shanks that are of a consistent size (typically, a ¼" hex shank), and usually have hexagonal cross sections. This style of chuck does not allow for accommodating a variety of tool shaft sizes.

The traditional three-jaw approach accommodates tools with round shafts and a range of different diameters and the more recent "quick-change" chucks allow for switching certain uniformly shaped and sized bits in a timely manner. However, there is still a need for a quickly and easily changeable tool holder to accommodate round shafts and shafts of various sizes.

SUMMARY

An apparatus is disclosed for holding the shaft of an object, wherein the shaft rotates in a first working direction. The apparatus comprises a bore, a first ball slot in communication with the bore, a first ball disposed within the first ball slot, and a spring. The bore has a longitudinal axis, and the shaft is inserted into the bore in an insertion direction. The first ball slot is in communication with the bore and comprises a ramp. The first ball slot has a first axis that is angularly offset from the longitudinal axis at an acute angle between the insertion direction and the first working direction. Upon insertion of the shaft into the bore, the shaft contacts the ball and causes it to move along the ramp within the ball slot, thereby compressing the spring by a first amount.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION OF ILLUSTRATIVE EMBODIMENTS

This disclosure describes a family of quick-change apparatuses for holding and rotationally driving round shafts, including those associated with rotary drive tool bits. However, it is to be understood that the disclosed mechanisms can also be used to hold tools and other objects having shafts of other cross-sectional shapes. In exemplary embodiments, a tool holder has a shaft bore with a longitudinal axis that corresponds with the length of a tool shaft, wherein the bore is configured to accept the tool shaft. Moreover, the tool holder has one or more ball slots exposed to the bore and positioned at a bias to the axis of the holder. A ball, such as one made of steel, is disposed in each ball slot and is influenced by one or more springs to urge it into contact with a ramp surface. The combination of the ramp and spring force urges each ball into contact with the outer diameter of a tool shaft or shank placed into the shaft bore. When the shaft is subjected to pull out and/or rotational forces, each ball is further urged against the ramp of its ball slot and is forced to roll and wedge between the ramp surface and the installed shaft. The angle of the ball slot and the angle of the ramp work together to produce a mechanical force that is applied through the ball between the holder and shaft. In the illustrated embodiments, biasing means such as compression springs are illustrated as exemplary ways to provide the bias force that urges each ball radially inwardly against the shaft of a tool bit. In an exemplary embodiment, two ball slots, each with one cooperating ball, are used. However, it is to be understood that fewer or more ball slots can be used in a tool holder of the present disclosure.

Figure 1:
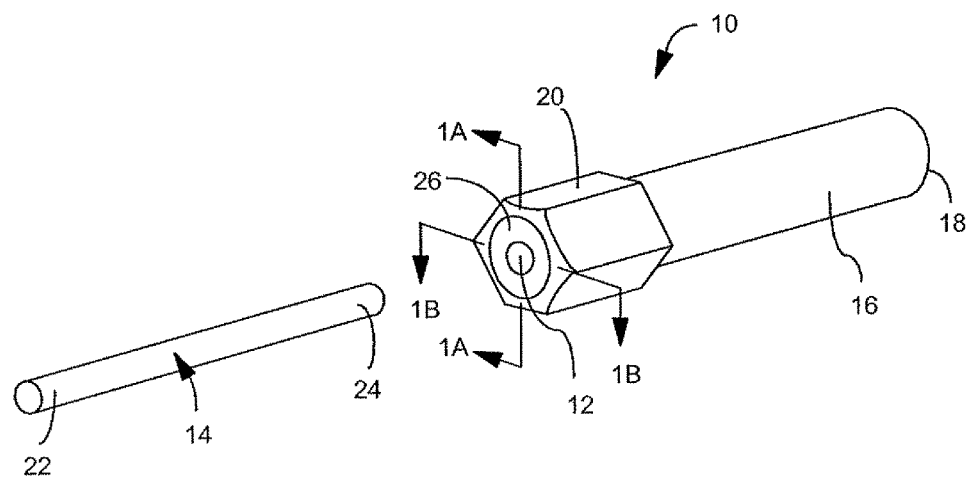
FIG. 1 is an isometric view of a first embodiment of a tool holder in accordance with the present disclosure, shown with an insertable tool.

A first exemplary embodiment of a tool holder 10 is shown in FIG. 1. Tool holder 10 includes a longitudinal shaft bore 12 for the insertion of shank or shaft 24 of tool 14. An end 22 of tool 14 can be variously shaped for tasks such as drilling or driving a screw. Because suitable shapes are variable and well known, they are not shown in the illustration. Spindle 16 has an end 18 that is shaped to provide a connection to a tool or a chuck for a power tool, for example. Nut or sleeve 20 overlies a portion of spindle 16 and attaches bushing 26 to spindle 16.

The internal configuration of a first embodiment of tool holder 10A is shown in FIGS. 2A-2D. In this embodiment, nut 20A is threadably attached to spindle 16A. Bushing 26 is held on spindle 16A by nut 20A and defines a path for shaft bore 12A. Shaft bore 12A has an open end 28A and terminates in bushing 26 at a terminating face 30A. The shaft bore 12A is substantially aligned along the longitudinal axis X of tool holder 10A.

Figure 2A:
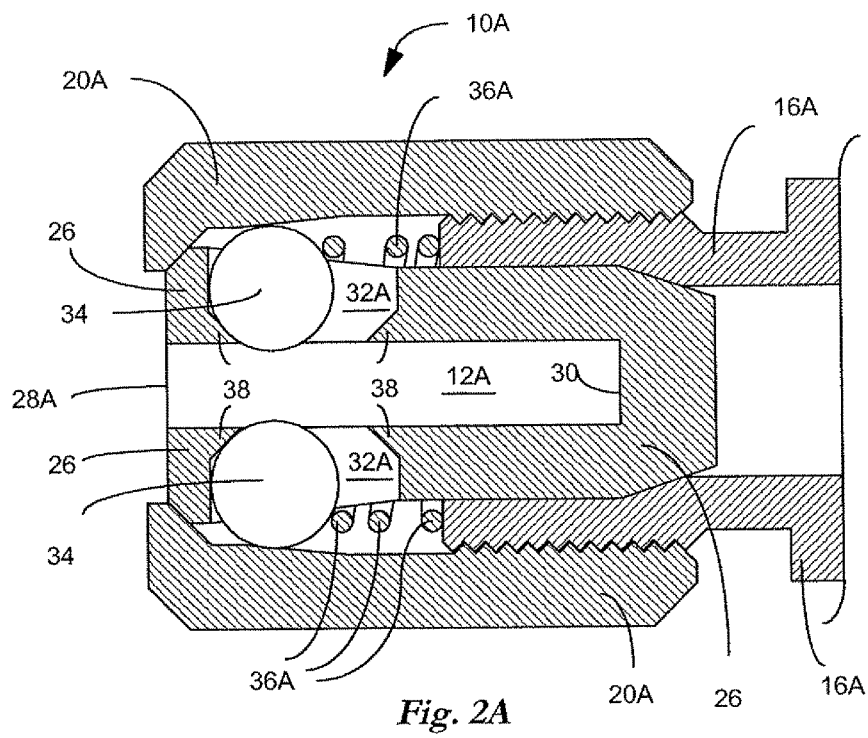
FIG. 2A is a sectional view of an exemplary internal configuration for the tool holder of FIG. 1, taken along line 1A-1A.
Figure 2B:
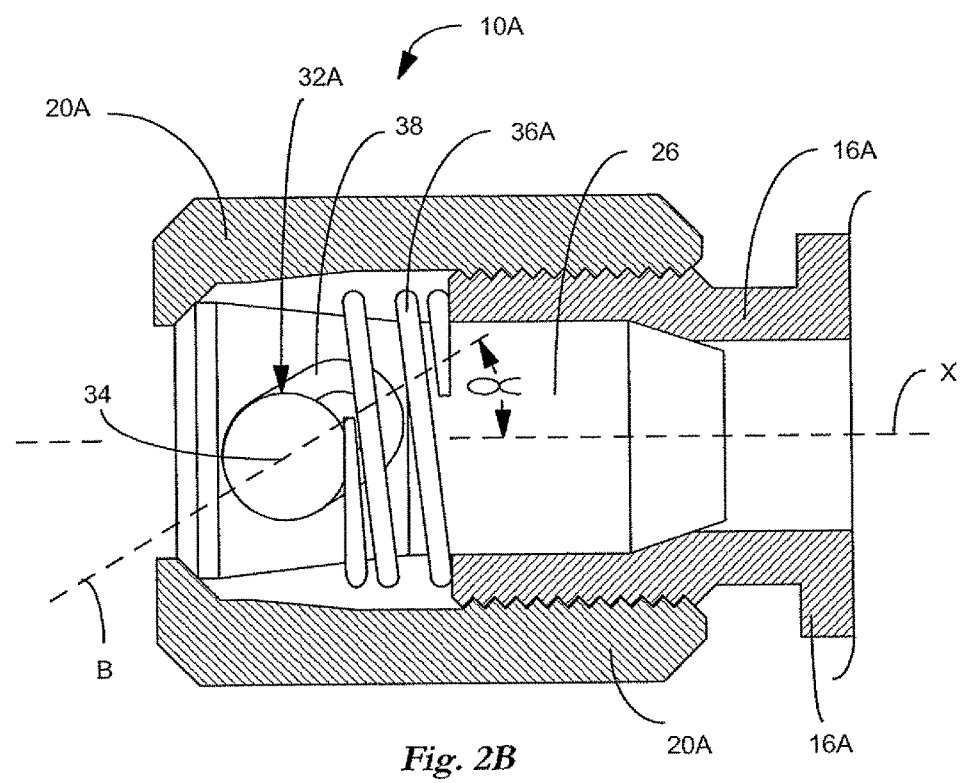
FIG. 2B is an interior view of the tool holder of FIG. 1, with the spindle and nut cut along section along line 1B-1B and the top portions of the spindle and nut removed.

Bushing 26 comprises a plurality of ball slots 32A, each ball slot 32A designed to contain a detent ball 34. Spring 36A resides in an area between spindle 16A, detent ball 34, bushing 26 and nut 20A. In an exemplary embodiment, spring 36A is a compression type helical coil spring, such that spring 36A biases detent balls 34 toward open end 28A of shaft bore 12A. Extensions 38 on bushing 26 prevent detent balls 34 from falling out of ball slot 32A and into shaft bore 12A. FIG. 2B shows the tool holder 10A of FIG. 2A from a perspective that is rotated 90° from the perspective of FIG. 2A. Referring to FIG. 1, FIG. 2B shows spindle 16A and nut 20A sectioned along line 1B-1B. However, the entirety of detent ball 34, spring 36A and bushing 26 are shown, as these parts are not cut through at the section line.

Figure 2C:
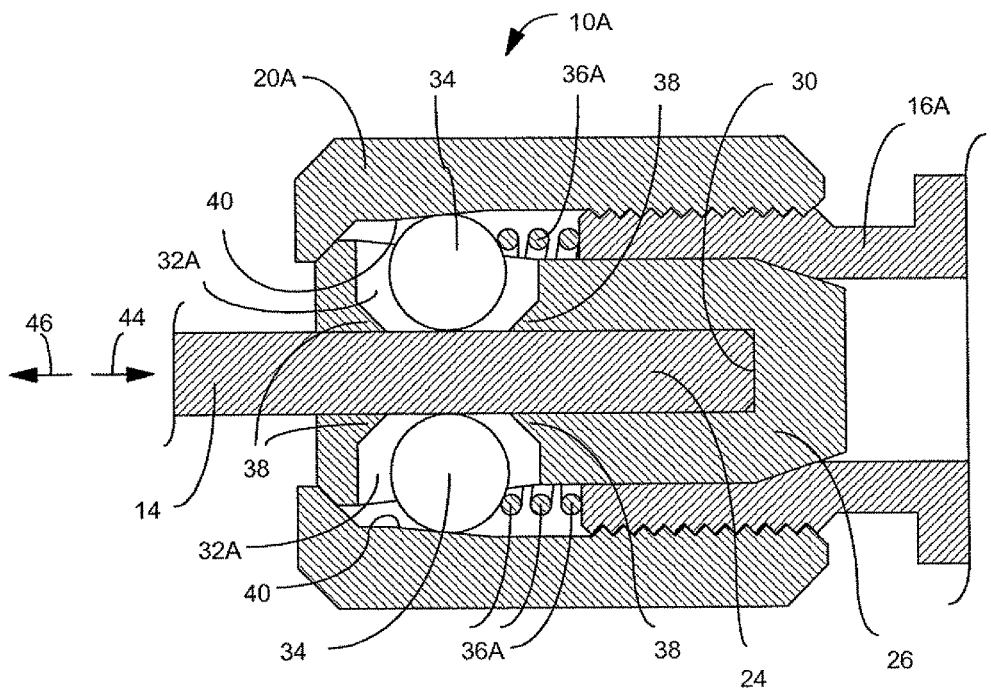
FIG. 2C is similar to FIG. 2A, but shows the tool holder with a tool shaft inserted therein.
Figure 2D:
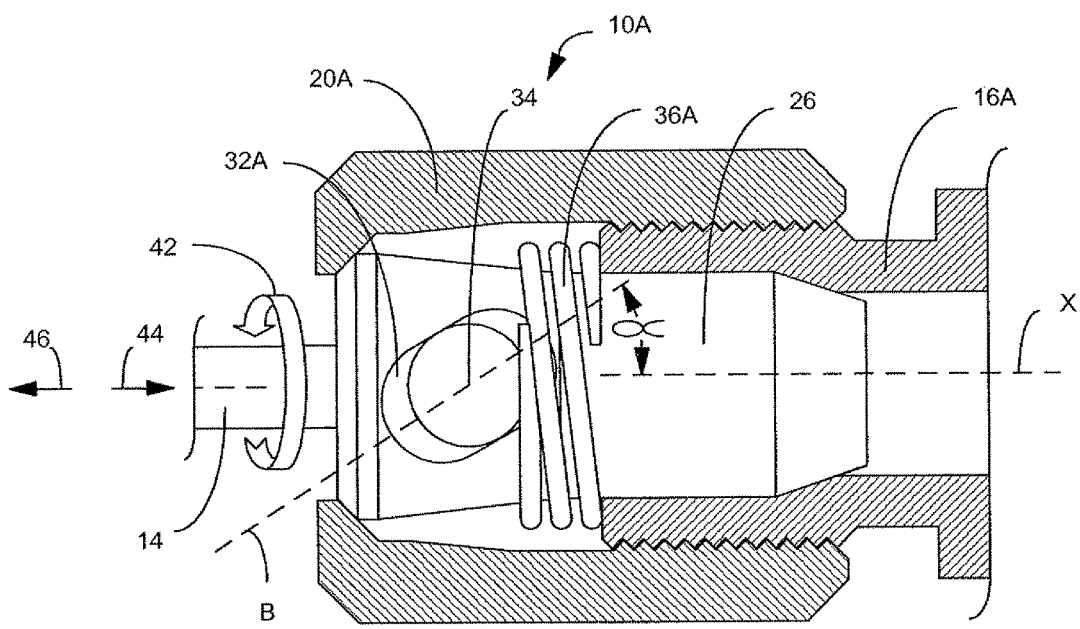
FIG. 2D is similar to FIG. 2B, but shows the tool holder with a tool shaft inserted therein.
Figure 3A:
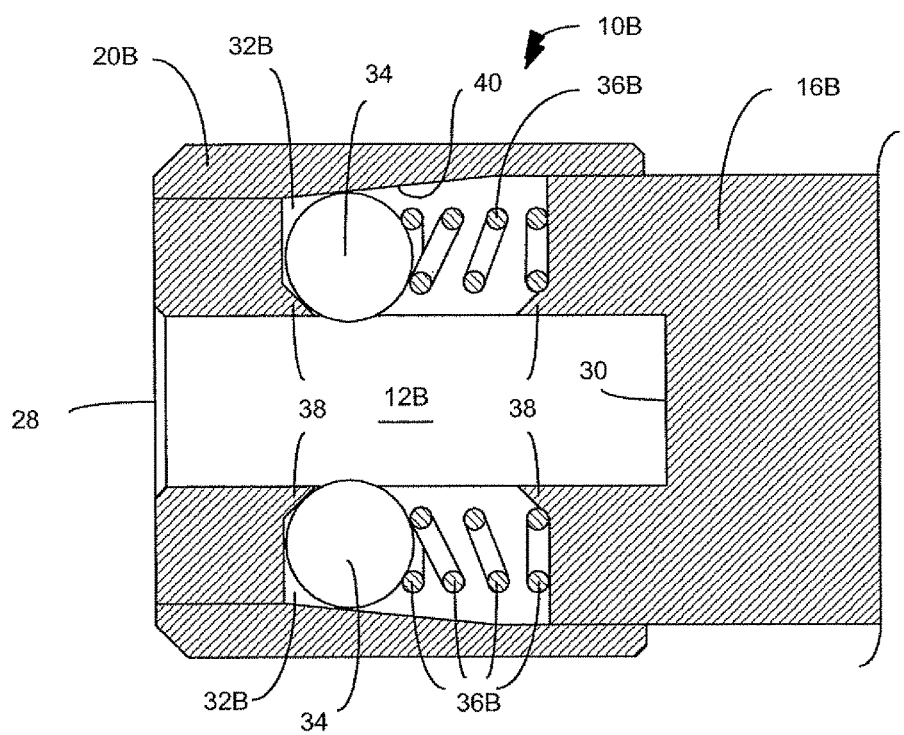
FIG. 3A is a sectional view of another exemplary internal configuration for the tool holder illustrated in FIG. 1, taken along line 1A-1A.
Figure 3B:
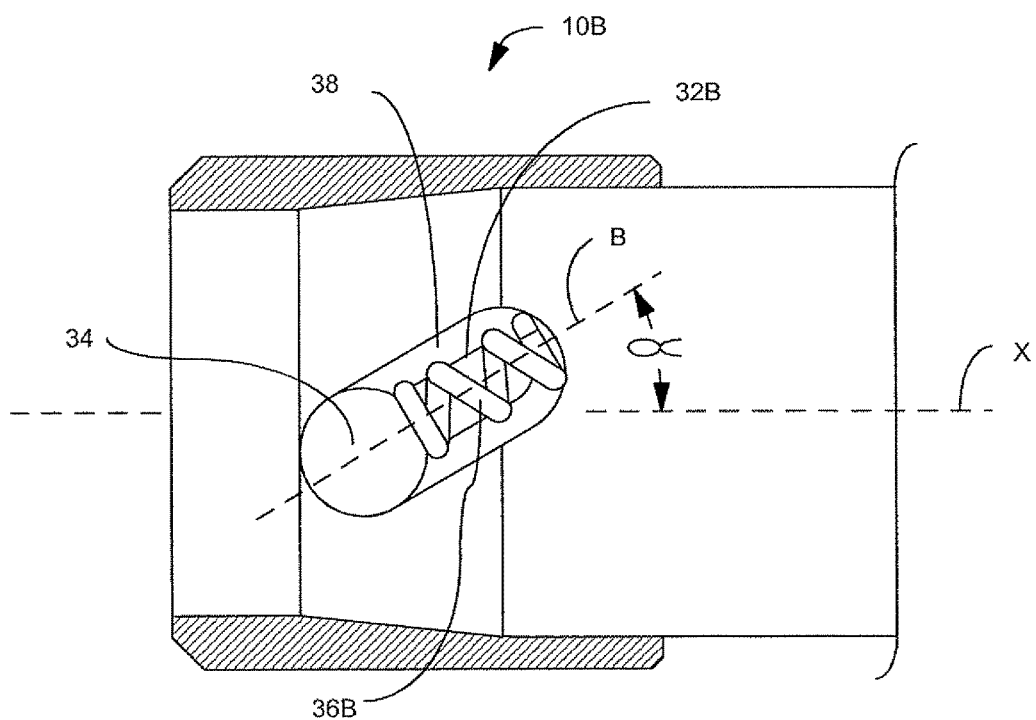
FIG. 3B is an interior view of the tool holder of FIG. 3A, with the sleeve cut along section along line 1B-1B of FIG. 1 and the top portion of the sleeve removed.
Figure 3C:
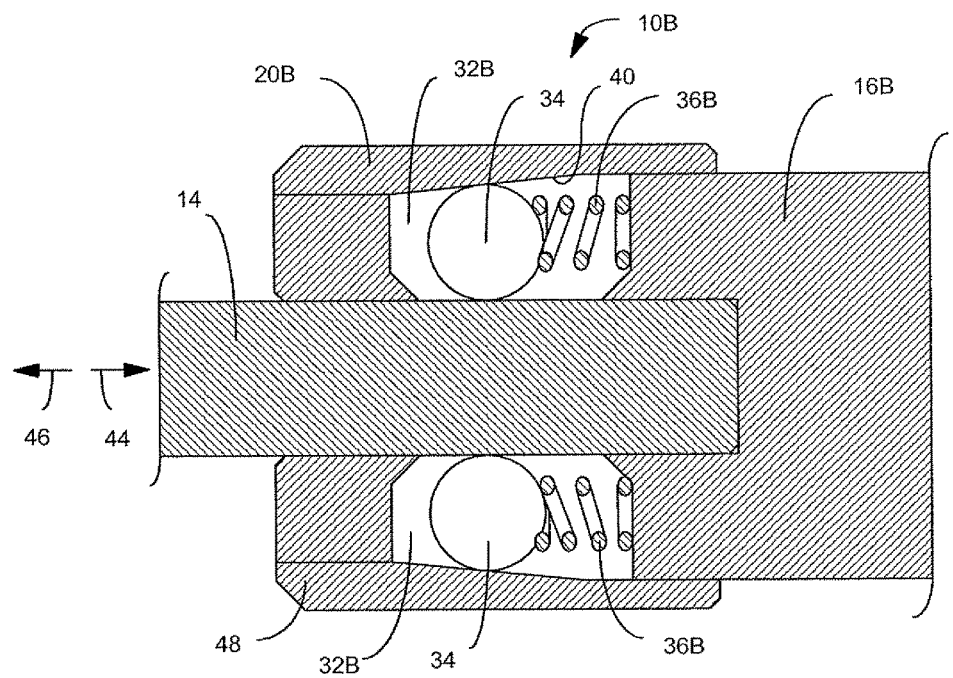
FIG. 3C is similar to FIG. 3A, but shows the tool holder with a tool shaft inserted therein.
Figure 3D:
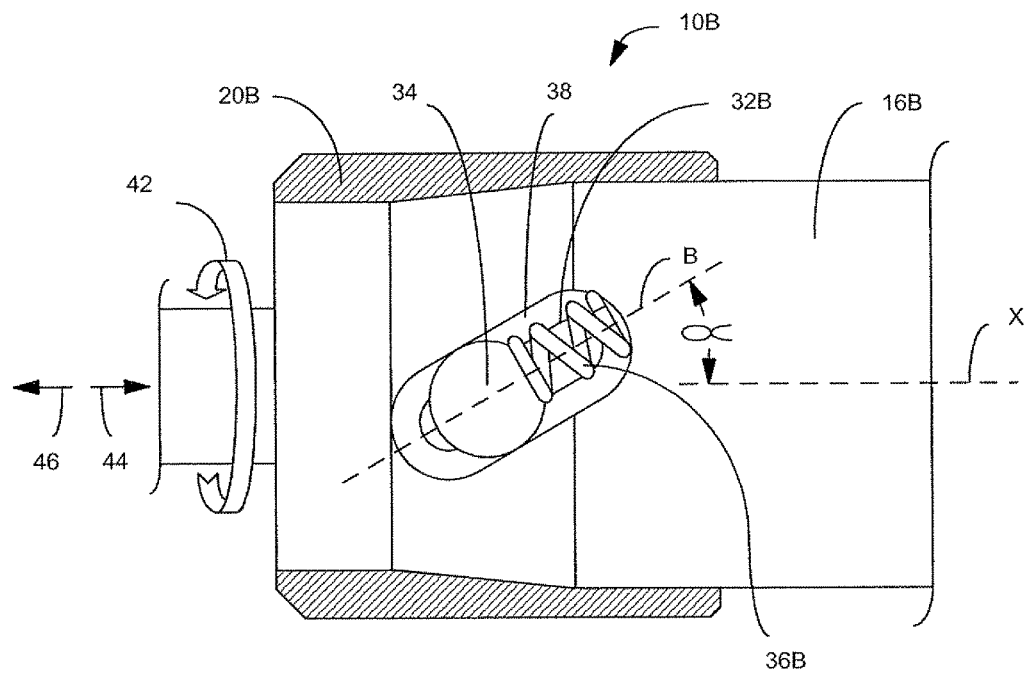
FIG. 3D is similar to FIG. 3B, but shows the tool holder with a tool shaft inserted therein.

FIGS. 2C and 2D show the insertion of shaft 24 of tool 14. When the shaft 24 is completely admitted into shaft bore 12, its end rests against the terminating face 30 of shaft bore 12A. As shaft 24 of tool 14 is inserted into shaft bore 12A, it contacts detent balls 34, thereby causing the balls 34 to roll against ramp 40 of an interior surface of nut 20A. This causes the balls 34 to advance in the direction of the shaft insertion 44, thereby compressing spring 36A. As is shown in a comparison of FIGS. 2B and 2D, ball 34 does not move parallel to the direction of shaft insertion 44. Rather, ball slot 32A is angularly offset from longitudinal axis X at an acute angle α between the insertion direction 44 and the first working direction 42. A compression axis of spring 36A is substantially parallel to and aligned with longitudinal axis X.

Once installed, the shaft 24 is retained and can be rotationally driven in the working direction 42 of tool bit rotation. If rotationally driven in a reverse or opposite direction, driving forces will not be transferred, and the holder 10A and shaft 24 will be freewheeling. The shaft 24 can be removed from the holder 10A by grasping the shaft 24 and turning it slightly in a reverse direction (as compared to working direction 42) as the shaft 24 is extracted in the removal direction 46.

A feature of the embodiment of FIGS. 2A-2D is that inner bushing 26 is removable and replaceable because nut 20A can be unthreaded from spindle 16A. A diameter of shaft bore 12 can be changed by interchanging the bushing with one having a different shaft bore diameter. Thus, a plurality of bushings can be provided to hold tool shafts of varying diameter.

Tool holder 10B shown in FIGS. 3A-3D does not use a removable bushing. Rather, a sleeve 20B having ramp 40 is fixed to spindle 16B. In this embodiment, spindle 16B houses shaft bore 12B and has extensions 38 to prevent detent balls 34 from falling out of ball slots 32B. Shaft bore 12B has an open end 28B and terminates in spindle 16B at a terminating face 30. The shaft bore 12B is substantially aligned along the longitudinal axis X of tool holder 10B. In this embodiment, ball slot 32B is disposed within spindle 16B. In an exemplary embodiment, spring 36B is a compression type helical coil spring, such that spring 36B biases detent balls 34 toward open end 28B of shaft bore 12B. A spring 36B is provided for each detent ball 34 within its respective ball slot 32B. An axis of compression of spring 36B is substantially parallel to and aligned with ball slot axis B.

As shaft 24 of tool 14 is inserted into shaft bore 12B, it contacts detent balls 34, thereby causing the balls 34 to roll against ramp 40 on an interior surface of sleeve 20B. This causes the ball 34 to advance in the direction of the shaft insertion 44, thereby compressing spring 36B. As is shown in a comparison of FIGS. 3B and 3D, ball 34 does not move parallel to the direction of shaft insertion 44. Rather, ball slot 32B is angularly offset from longitudinal axis X at an acute angle $\alpha$ between the insertion direction 44 and the first working direction 42.

Once installed, the shaft 24 is retained and can be rotationally driven in the working direction 42 of tool bit rotation. If rotationally driven in a reverse or opposite direction, driving forces will not be transferred, and the holder 10B and shaft 24 will be freewheeling. The shaft 24 can be removed from the holder 10B by grasping the shaft 24 and turning it slightly in a reverse direction (as compared to working direction 42) as the shaft 24 is extracted in the removal direction 46.

Figure 4:
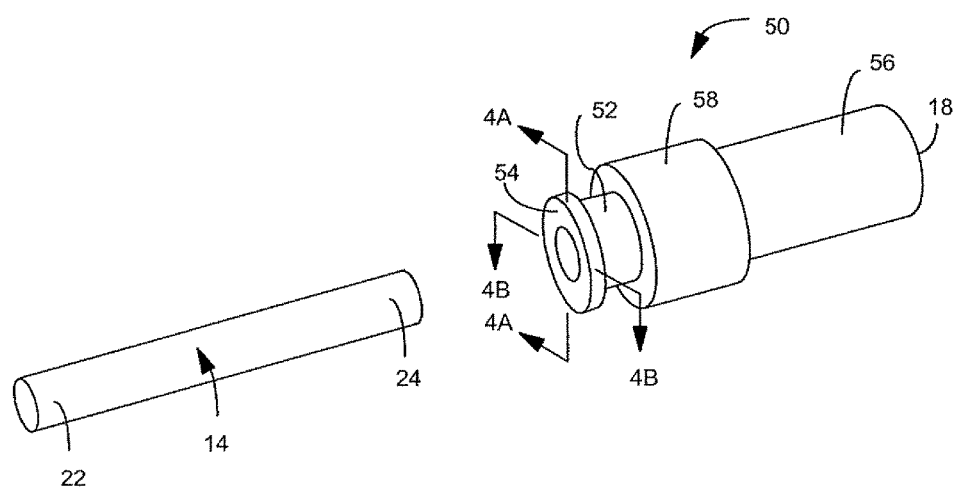
FIG. 4 is an isometric view of an exemplary embodiment of a tool holder having a front release feature, shown with an insertable tool.

FIG. 4 is an isometric view of a tool holder 50 featuring a front release mechanism comprising release tube 52 having flange 54. Tool holder 50 also includes spindle 56 and sleeve 58. The internal configuration of a first embodiment of tool holder 50A is shown in FIGS. 5A-5F. Sleeve 58A having ramp 40 is fixed to spindle 56A. In this embodiment, release tube 52A and spindle 56A together house shaft bore 12C. Ball slots 32C are formed within spindle 56A and release tube 52A. Release tube 52A and has extensions 38 to prevent detent balls 34 from falling out of ball slots 32C. Shaft bore 12C has an open end 28C and terminates in spindle 56A at a terminating face 30. The shaft bore 12C is substantially aligned along the longitudinal axis X of tool holder 50A.

In this embodiment, a spring 36C surrounds shaft 24 within spindle 56A and acts upon rear surface 60 of release tube 52A. In an exemplary embodiment, spring 36C is a compression type helical coil spring, such that spring 36C biases detent balls 34 toward open end 28C of shaft bore 12C. A compression axis of spring 36C is substantially parallel to and aligned with longitudinal axis X.

As shaft 24 of tool 14 is inserted in insertion direction 44 into shaft bore 12C, it contacts detent balls 34, thereby causing the balls 34 to roll against ramp 40 of an interior surface of sleeve 58A. This causes the balls 34 to advance in the direction of the shaft insertion 44, thereby compressing spring 36C. As is shown in a comparison of FIGS. 5B and 5D, ball 34 does not move parallel to the direction of shaft insertion 44. Rather, ball slot 32C is angularly offset from longitudinal axis X at an acute angle $\alpha$ between the insertion direction 44 and the first working direction 42. Once installed, the shaft 24 is retained and can be rotationally driven in the working direction 42 of tool bit rotation. If rotationally driven in a reverse or opposite direction, driving forces will not be transferred, and the holder 50A and shaft 24 will be freewheeling.

Figure 5A:
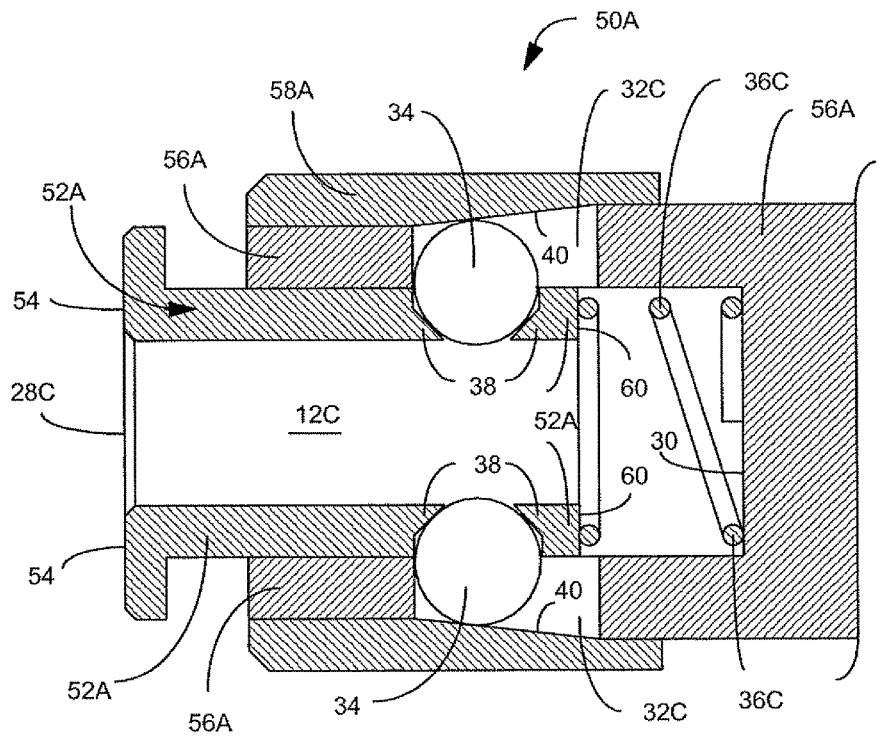
FIG. 5A is a sectional view of an exemplary internal configuration for the tool holder of FIG. 4, taken along line 4A-4A.
Figure 5B:
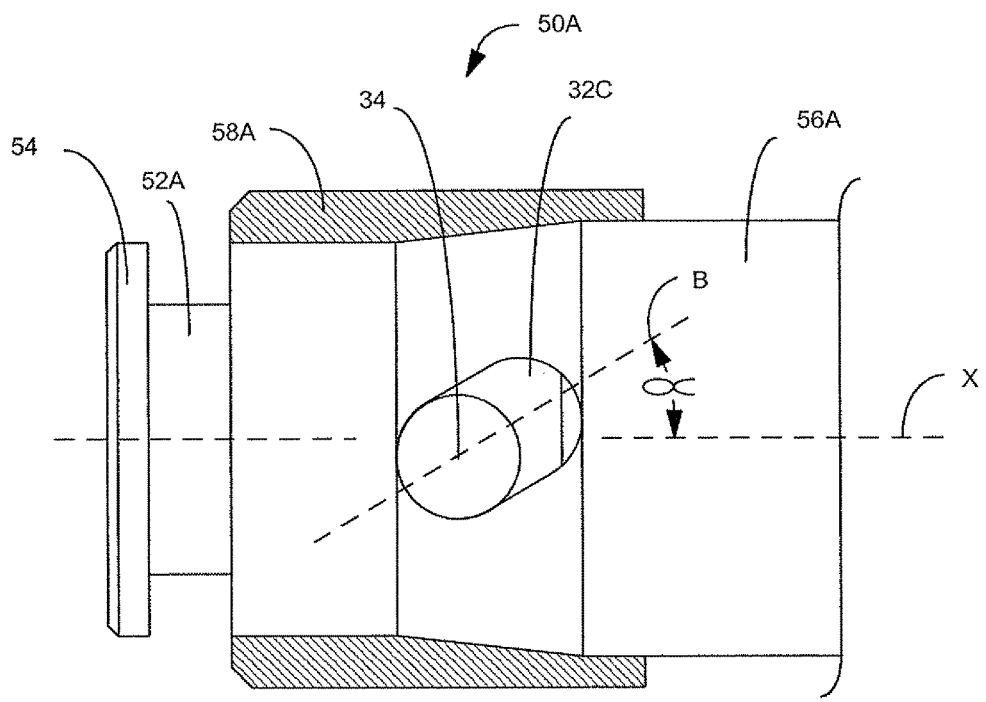
FIG. 5B is an interior view of the tool holder of FIG. 5A, with the sleeve cut along section along line 4B-4B of FIG. 4 and the top portion of the sleeve removed.
Figure 5C:
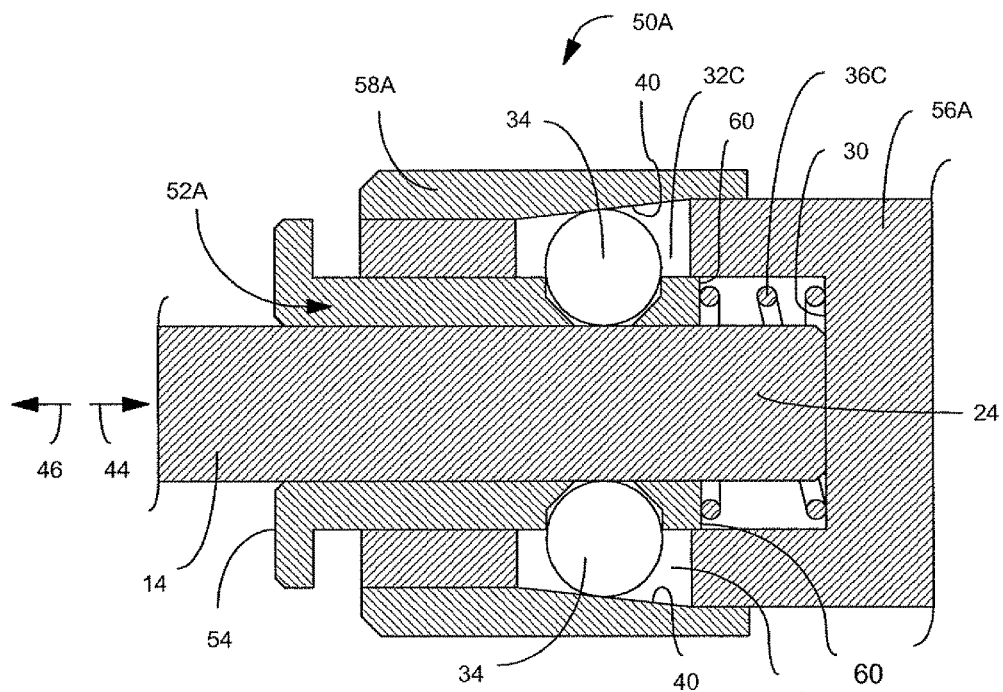
FIG. 5C is similar to FIG. 5A, but shows the tool holder with a tool shaft inserted therein.
Figure 5D:
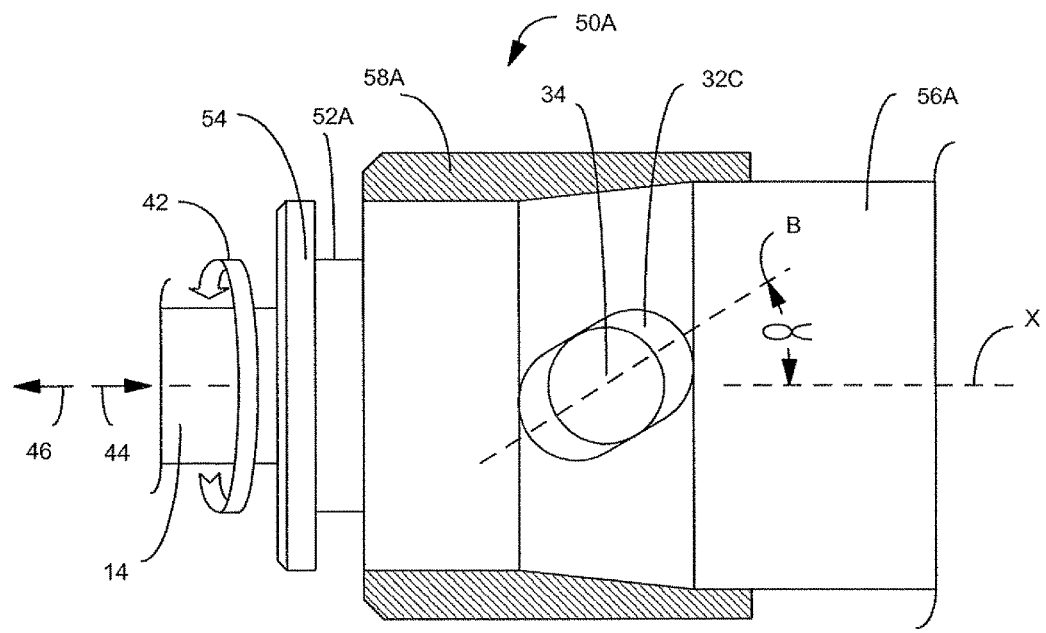
FIG. 5D is similar to FIG. 5B, but shows the tool holder with a tool shaft inserted therein.
Figure 5E:
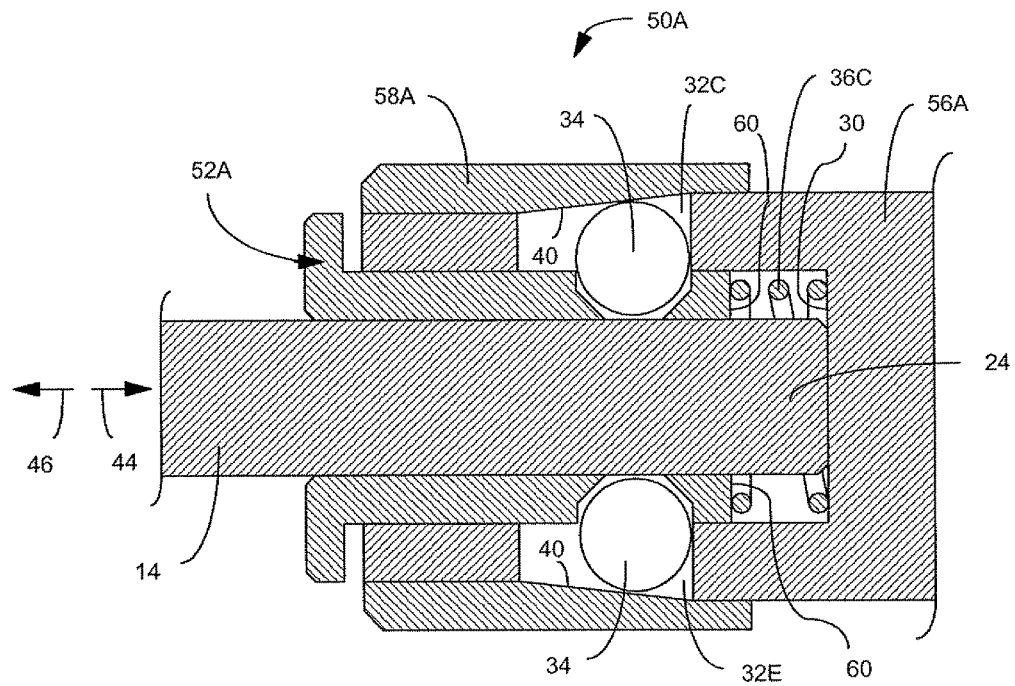
FIG. 5E is similar to FIG. 5C, but shows spring compression by the front release mechanism for extraction of the tool shaft.
Figure 5F:
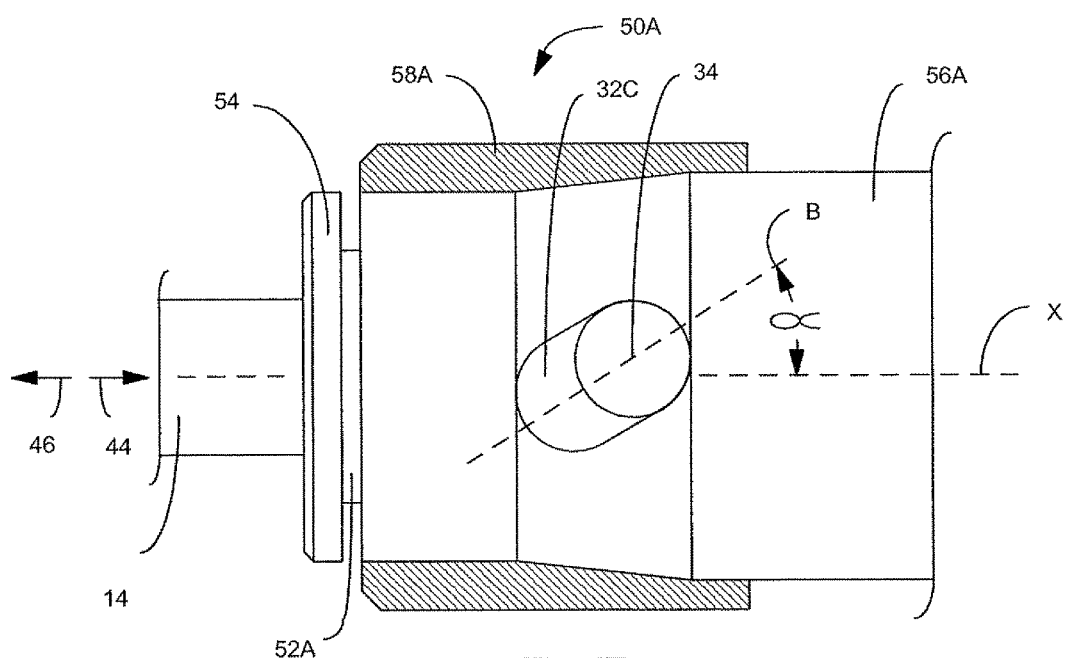
FIG. 5F is similar to FIG. 5D, but shows spring compression by the front release mechanism for extraction of the tool shaft.

Removal is facilitated by pushing the flange 54 toward the sleeve 58A while extracting the shaft 24 in removal direction 46. As shown in FIGS. 5E and 5F, pushing on flange 54 of release tube 52A causes rear surface 60 of release tube 52A to further compress spring 36C, allowing balls 34 to move up ramps 40 and away from contact with shaft 24. With shaft 24 thereby released from the holding forces of balls 34, shaft 24 can then be extracted in removal direction 46. As can be seen in FIG. 5F, as balls 34 move up ramps 40, they move within ball slots 32C along ball axis B.

The internal configuration of a second embodiment of tool holder 50B is shown in FIGS. 6A-6F. Sleeve 58B having ramp 40 is fixed to spindle 56B. In this embodiment, spindle 56B houses shaft bore 12D. Ball slots 32D are formed in spindle 56B and release tube 52B. Spindle 56B has extensions 38 to prevent detent balls 34 from falling out of ball slots 32D. Shaft bore 12D has an open end 28D and terminates in spindle 56B at a terminating face 30. The shaft bore 12D is substantially aligned along the longitudinal axis X of tool holder 50B.

In this embodiment, a shoulder 62 is formed on spindle 56B so that a spring receiving area 64 resides between shoulder 62, rear surface 60 of release tube 52B and an interior surface of sleeve 58B. Spring 36D acts upon rear surface 60 of release tube 52B. In an exemplary embodiment, spring 36D is a compression type helical coil spring, such that spring 36D biases detent balls 34 toward open end 28D of shaft bore 12D. A compression axis of spring 36D is substantially parallel to and aligned with longitudinal axis X.

As shaft 24 of tool 14 is inserted in insertion direction 44 into shaft bore 12D, it contacts detent balls 34, thereby causing the balls 34 to roll against ramp 40 of an interior surface of sleeve 58B. This causes the balls 34 to advance in the direction of the shaft insertion 44, thereby compressing spring 36D. As is shown in a comparison of FIGS. 6B and 6D, ball 34 does not move parallel to the direction of shaft insertion 44. Rather, ball slot 32D is angularly offset from longitudinal axis X at an acute angle $\alpha$ between the insertion direction 44 and the first working direction 42. Once installed, the shaft 24 is retained and can be rotationally driven in the working direction 42 of tool bit rotation. If rotationally driven in a reverse or opposite direction, driving forces will not be transferred, and the holder 50B and shaft 24 will be freewheeling.

Figure 6A:
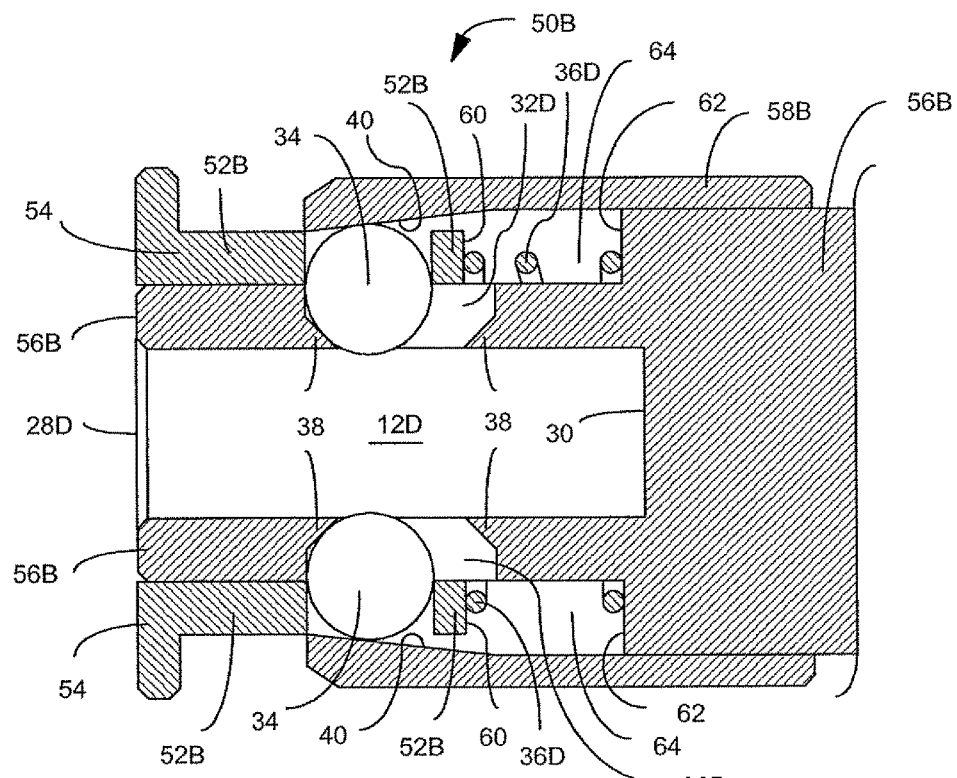
FIG. 6A is a sectional view of another exemplary internal configuration for the tool holder illustrated in FIG. 4, taken along line 4A-4A.
Figure 6B:
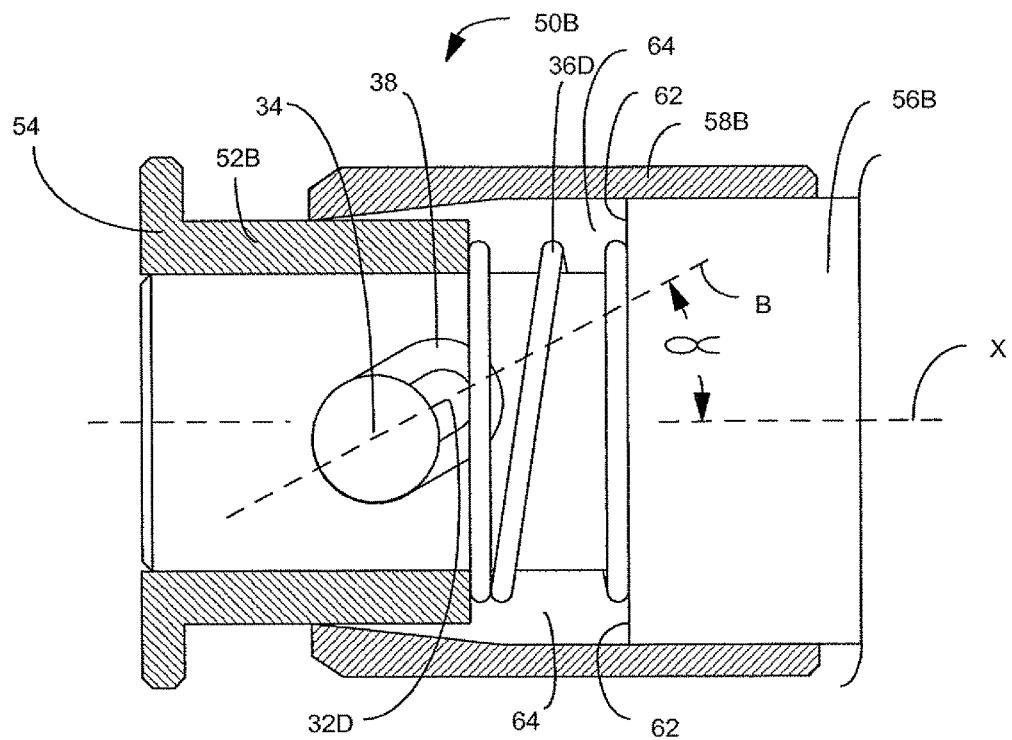
FIG. 6B is an interior view of the tool holder of FIG. 6A, with the release tube and sleeve cut along section along line 4B-4B of FIG. 4 and the top portions of the release tube and sleeve removed.
Figure 6C:
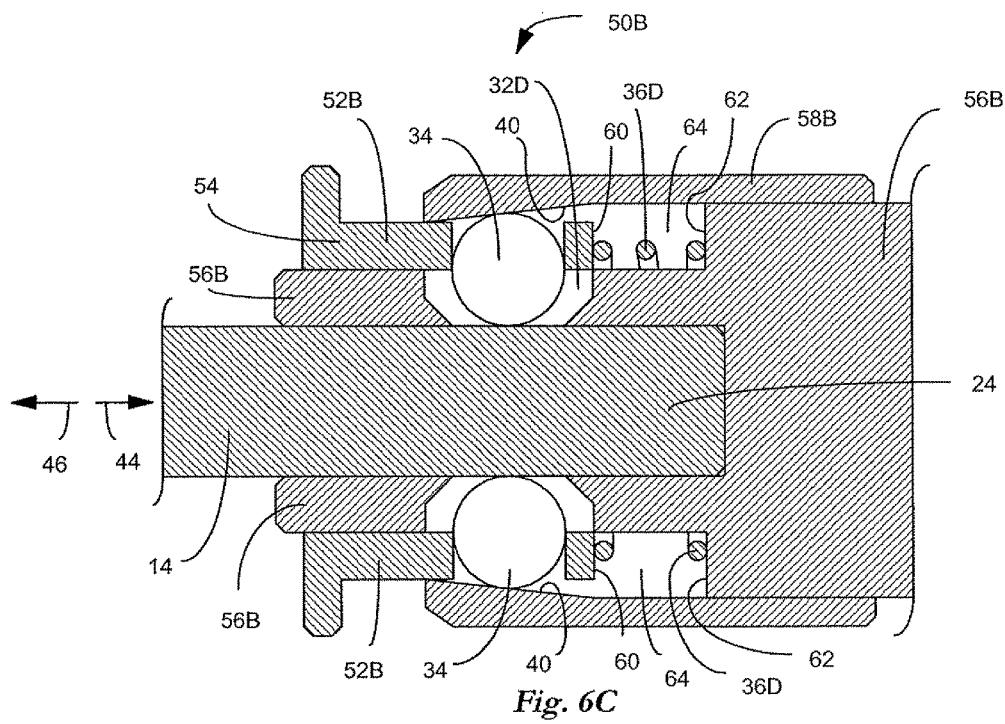
FIG. 6C is similar to FIG. 6A, but shows the tool holder with a tool shaft inserted therein.
Figure 6D:
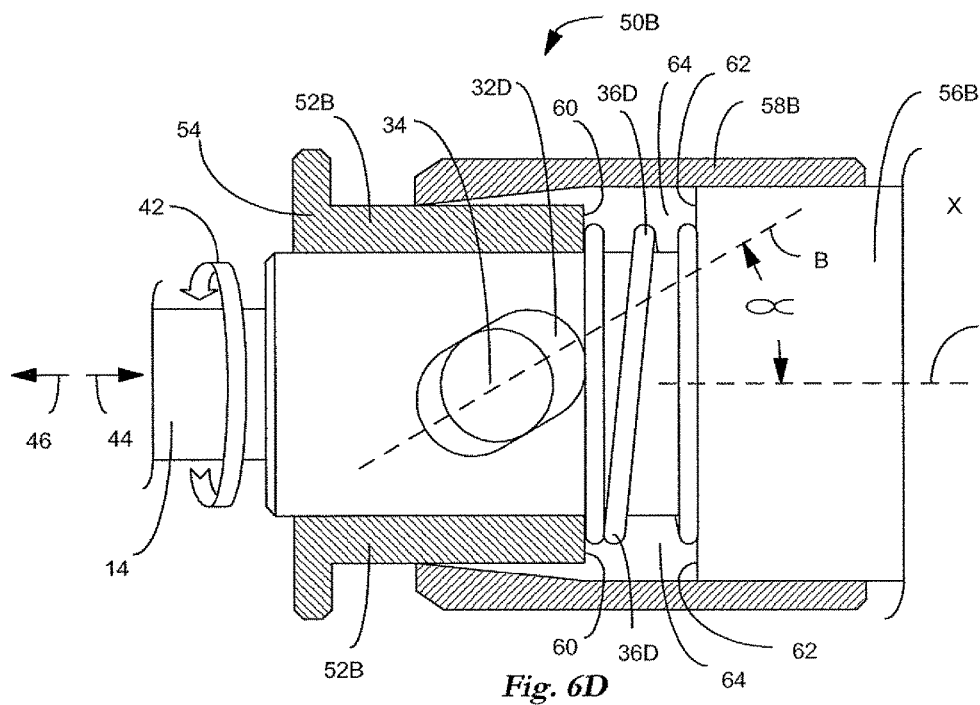
FIG. 6D is similar to FIG. 6B, but shows the tool holder with a tool shaft inserted therein.
Figure 6E:
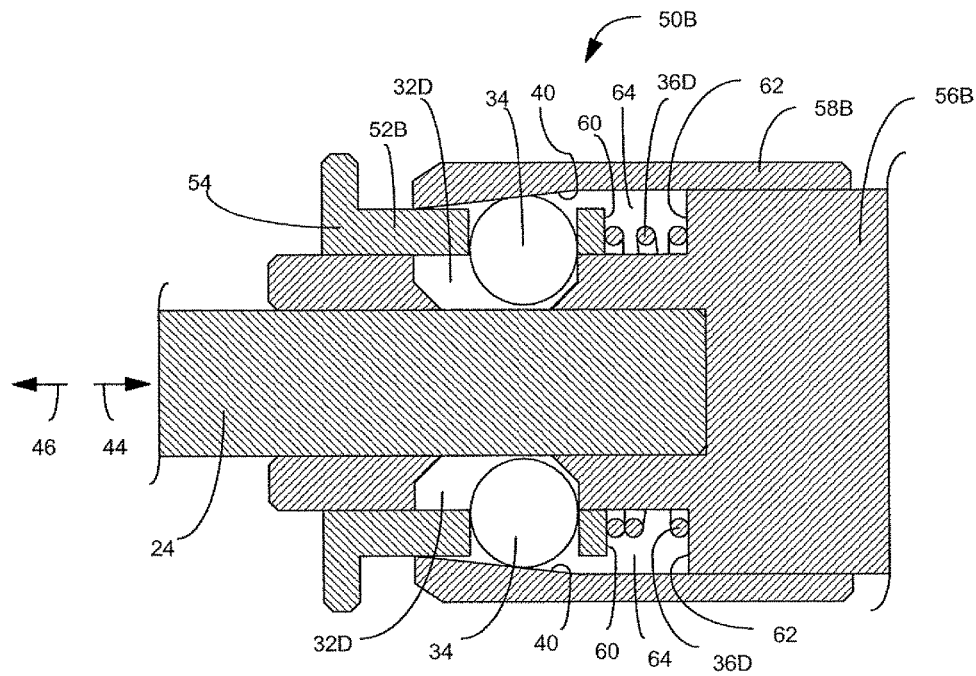
FIG. 6E is similar to FIG. 6C, but shows spring compression by the front release mechanism for extraction of the tool shaft.
Figure 6F:
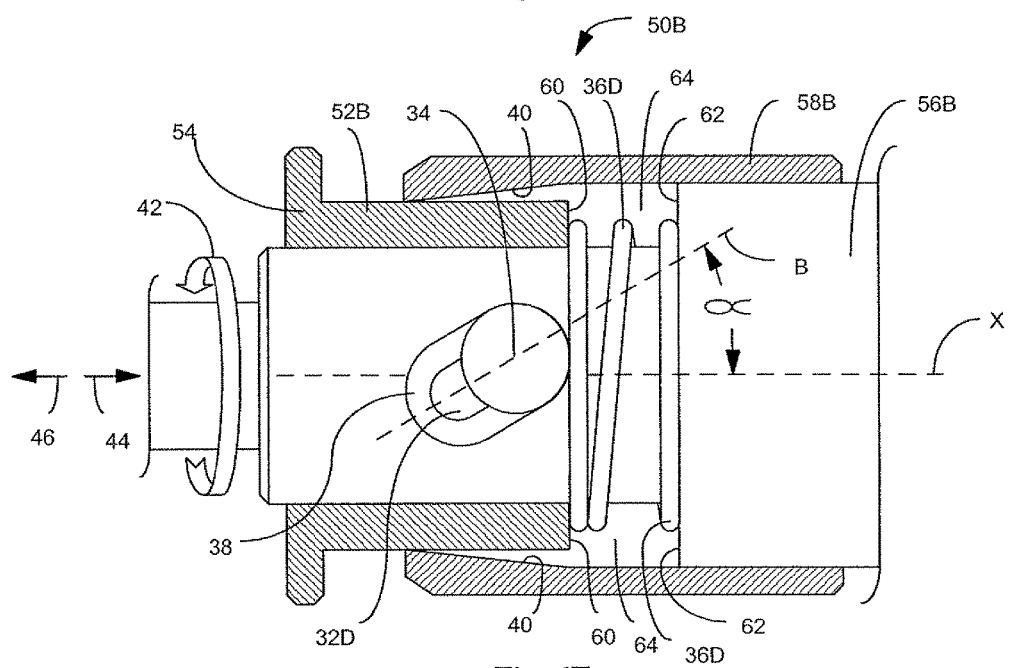
FIG. 6F is similar to FIG. 6D, but shows spring compression by the front release mechanism for extraction of the tool shaft.

Removal is facilitated by pushing the flange 54 toward the sleeve 58B while extracting the shaft 24 in removal direction 46. As shown in FIGS. 6E and 6F, pushing on flange 54 of release tube 52B causes rear surface 60 of release tube 52B to further compress spring 36D, allowing balls 34 to move up ramps 40 and away from contact with shaft 24. With shaft 24 thereby released from the holding forces of balls 34, shaft 24 can then be extracted in removal direction 46. As can be seen in FIG. 6F, as balls 34 move up ramps 40, they move within ball slots 32D along ball axis B.

Figure 7:
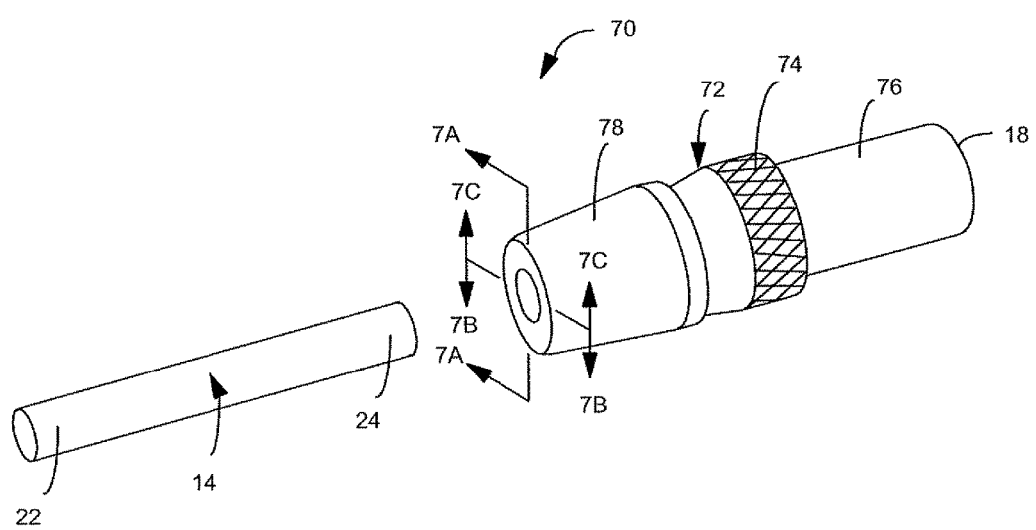
FIG. 7 is an isometric view of an exemplary embodiment of a tool holder having a rear release feature, shown with an insertable tool.

FIG. 7 is an isometric view of a tool holder 70 featuring a rear release mechanism comprising release sleeve 72 having grasp area 74; a spindle 76; and a sleeve 78. In an exemplary embodiment, grasp area 74 has a textured exterior surface to facilitate gripping. The textured exterior surface of grasp area 74 may be formed by methods including knurling, for example.

The internal configuration of an exemplary embodiment of tool holder 70 is shown in FIGS. 8A-8F. Sleeve 78 having ramp 40 on an interior surface thereof is fixed to spindle 76. In this embodiment, spindle 76 houses shaft bore 12E. The shaft bore 12E is substantially aligned along the longitudinal axis X of tool holder 70. Shaft bore 12E has an open end 28E and terminates in spindle 76 at a terminating face 30. Ball slots 32E are formed within spindle 76 and release sleeve 72. Spindle 76 has extensions 38 to prevent detent balls 34 from falling out of ball slots 32E.

This embodiment further includes retaining clips 80 fixed to spindle 76 to hold a spring retaining member such as washer 82. A spring receiving area 84 resides between washer 82, an interior of release sleeve 72 and an exterior surface of spindle 76. Spring 36E acts upon surface 86 of release sleeve 72. In an exemplary embodiment, spring 36E is a compression type helical coil spring, such that spring 36E biases detent balls 34 toward open end 28E of shaft bore 12E. A compression axis of spring 36E is substantially parallel to and aligned with longitudinal axis X.

Figure 8A:
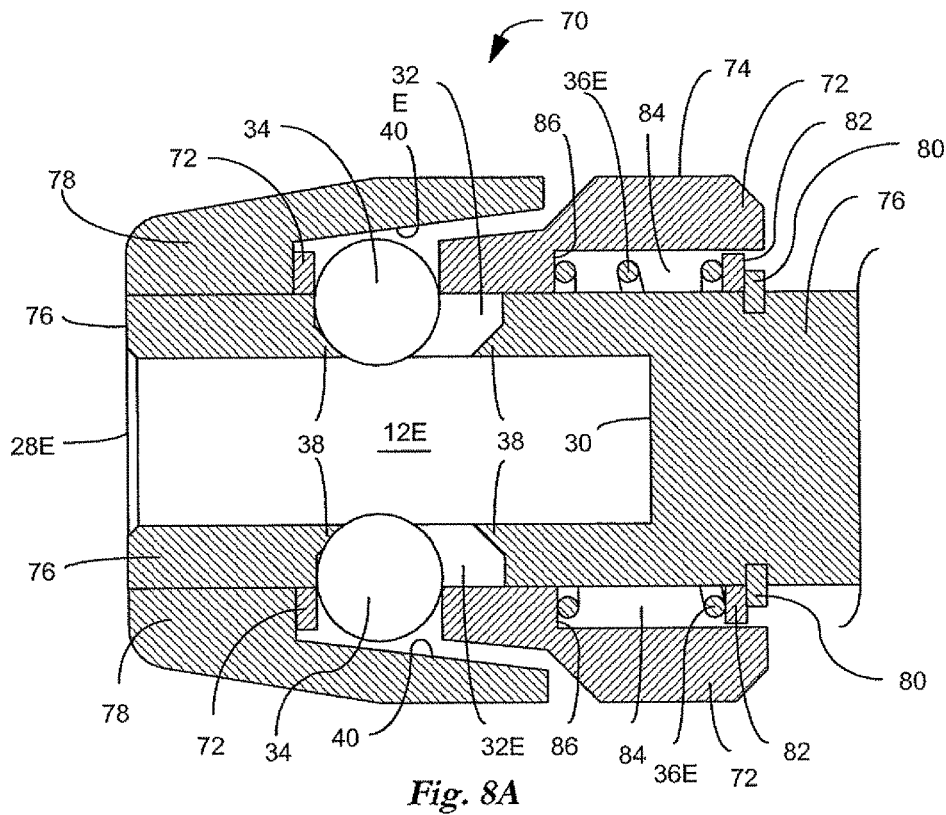
FIG. 8A is a sectional view of an exemplary embodiment of the internal configuration of the tool holder of FIG. 7, taken along line 7A-7A.
Figure 8B:
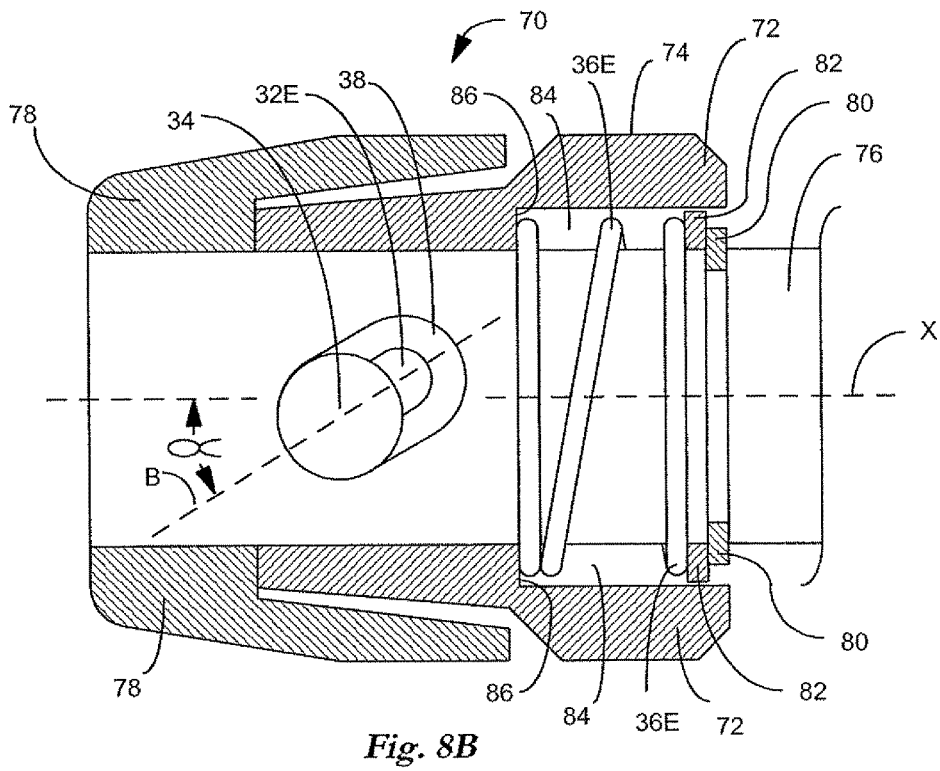
FIG. 8B is an interior view of the tool holder of FIG. 8A, with the fixed and release sleeves cut along section along line 7B-7B of FIG. 7 and the top portions of the fixed and release sleeves removed.
Figure 8C:
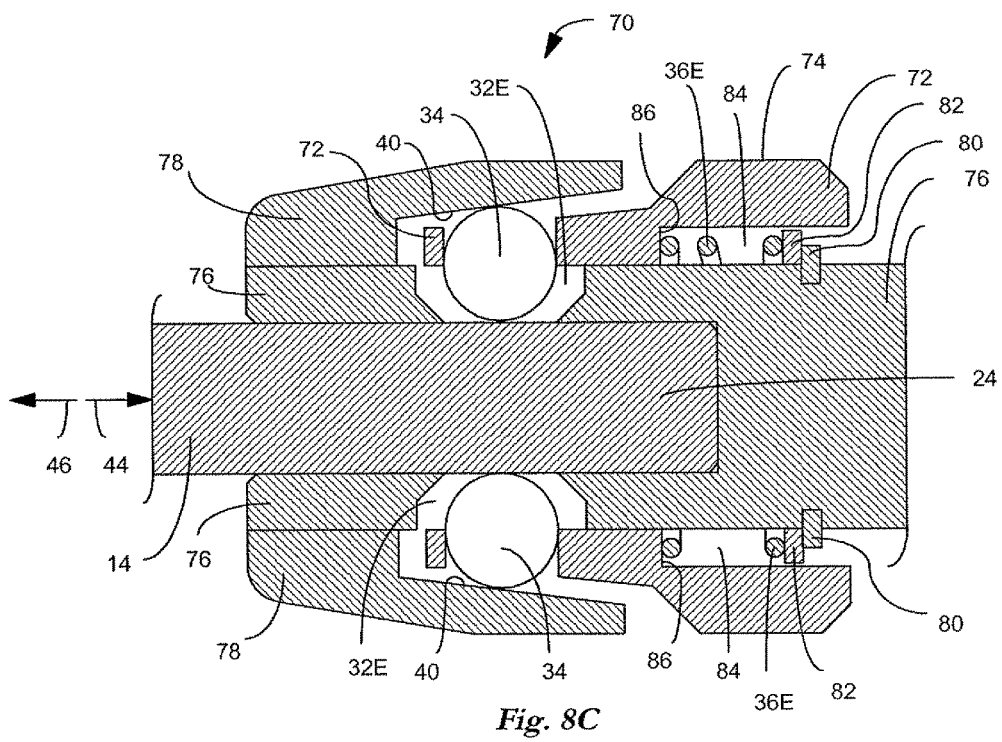
FIG. 8C is similar to FIG. 8A, but shows the tool holder with a tool shaft inserted therein.
Figure 8D:
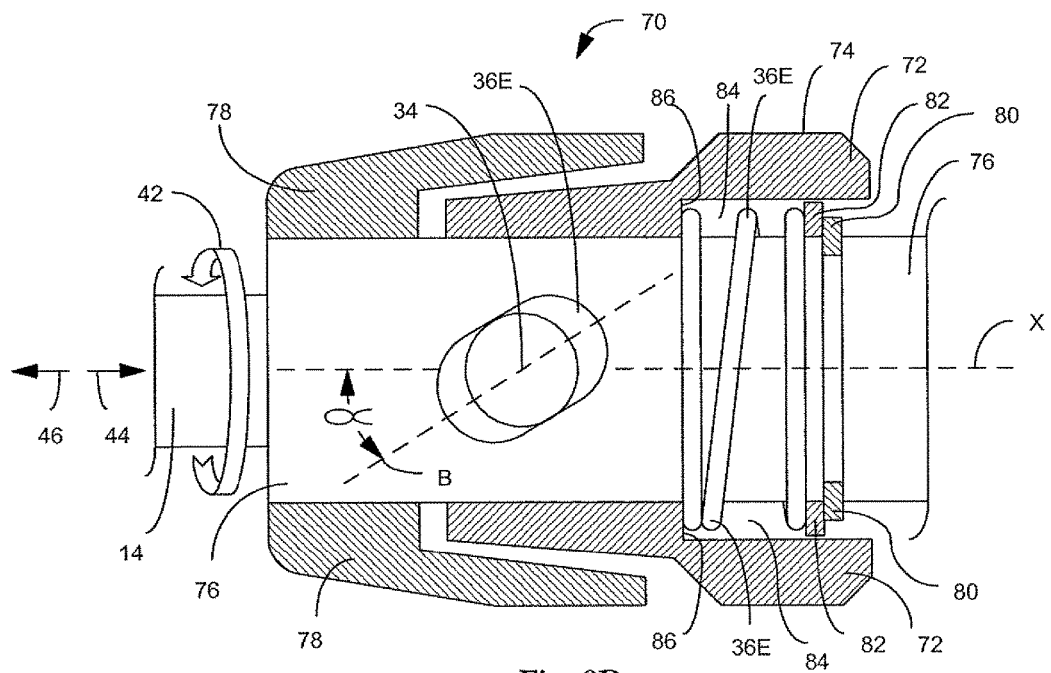
FIG. 8D is similar to FIG. 8B, but shows the tool holder with a tool shaft inserted therein.

As shown in FIGS. 8C-8D, as shaft 24 of tool 14 is inserted in insertion direction 44 into shaft bore 12E, it contacts detent balls 34, thereby causing the balls 34 to roll against ramp 40 of an interior surface of sleeve 78. This causes the balls 34 to advance in the direction of the shaft insertion 44, thereby compressing spring 36E. As shown in a comparison of FIGS. 8B and 8D, ball 34 does not move parallel to the direction of shaft insertion 44. Rather, ball slot 32E is angularly offset from longitudinal axis X at an acute angle α between the insertion direction 44 and the first working direction 42. Once installed, the shaft 24 is retained and can be rotationally driven in the working direction 42 of tool bit rotation. If rotationally driven in a reverse or opposite direction, driving forces will not be transferred, and the holder 70 and shaft 24 will be freewheeling.

Figure 8E:
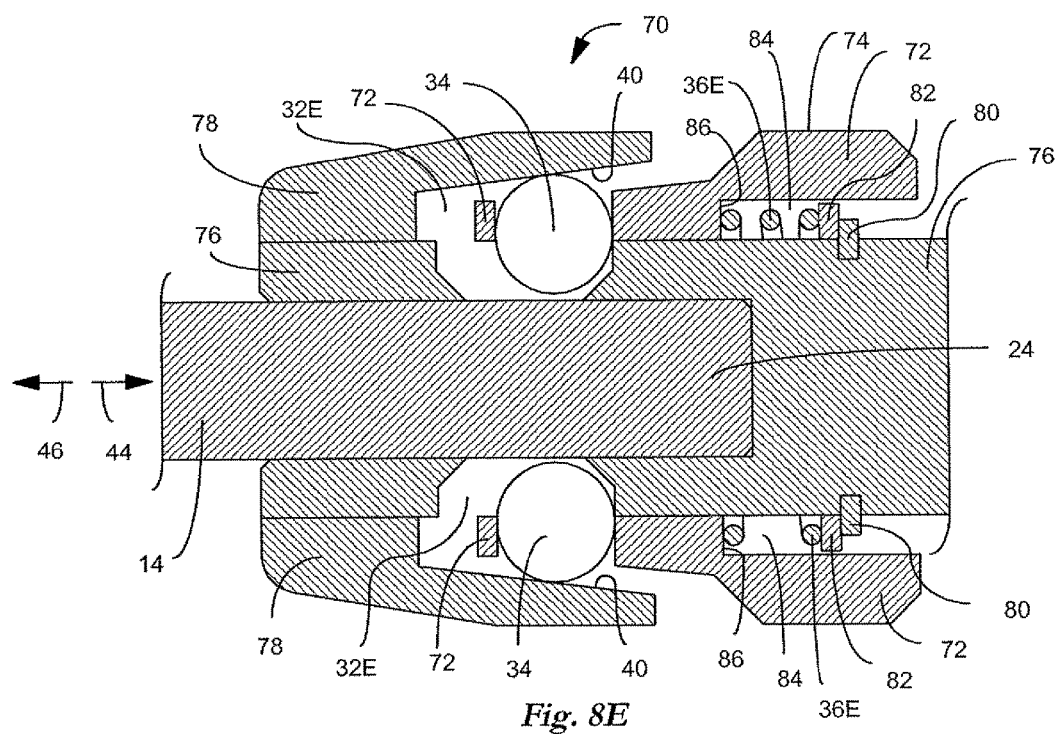
FIG. 8E is similar to FIG. 8C, but shows spring compression by the rear release mechanism for extraction of the tool shaft.
Figure 8F:
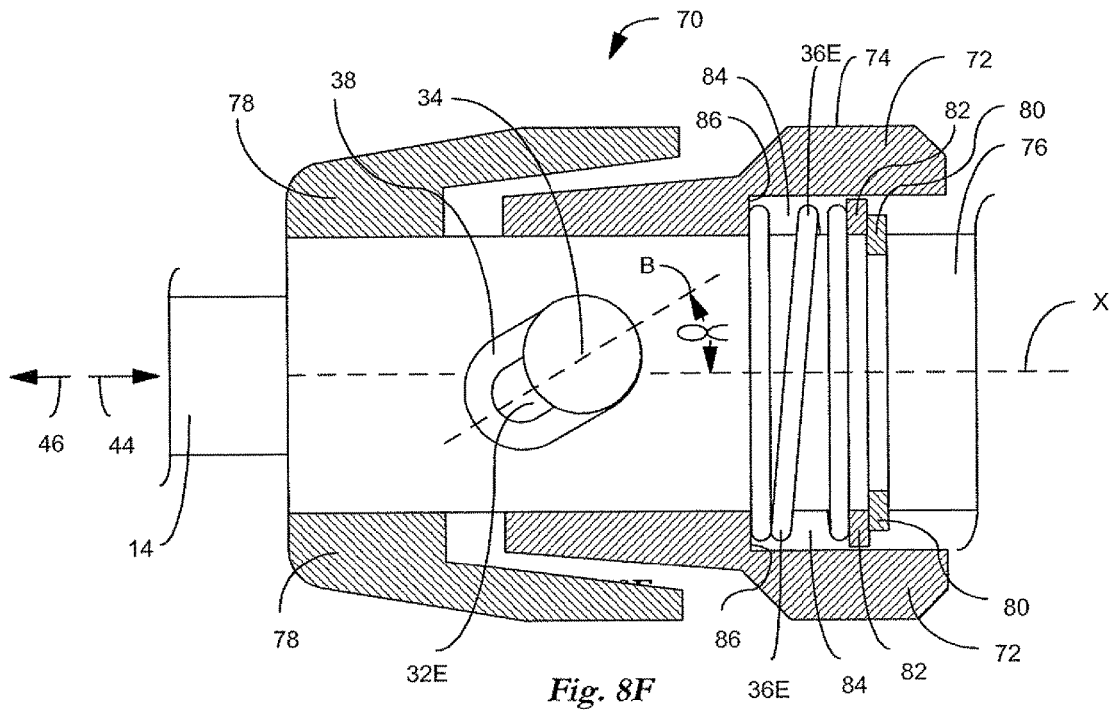
FIG. 8F is similar to FIG. 8D, but shows spring compression by the rear release mechanism for extraction of the tool shaft.

Removal is facilitated by gripping grasp area 74 of release sleeve 72 and pulling release sleeve 72 away from sleeve 78 while extracting the shaft 24 in removal direction 46. As shown in FIGS. 8E and 8F, pulling on release sleeve 72 causes surface 86 of release tube 72 to further compress spring 36E against fixed washer 82, thereby allowing balls 34 to move up ramps 40 and away from contact with shaft 24. With shaft 24 thereby released from the holding forces of balls 34, shaft 24 can then be extracted in removal direction 46. As can be seen in FIG. 8F, as balls 34 move up ramps 40, they move within ball slots 32E along ball axis B.

Figure 9:
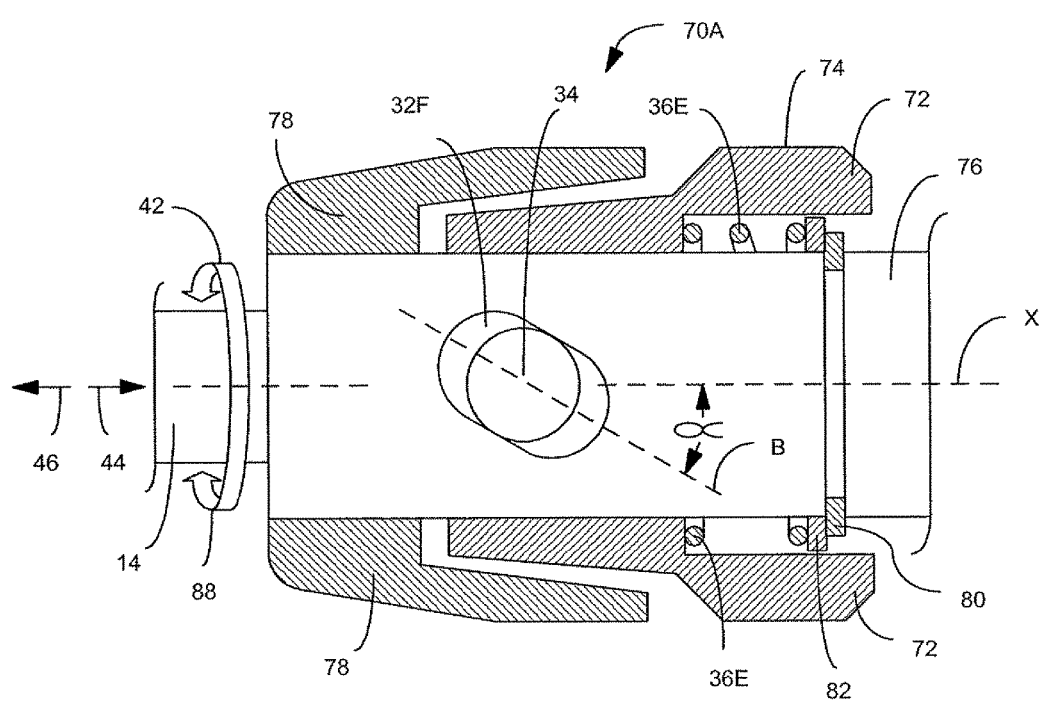
FIG. 9 is similar to FIG. 8D, but shows an embodiment of a tool holder with bidirectional drive, viewed at section line 7C-7C of FIG. 7.

Bi-directional driving capacity can be achieved by at least one ball slot with an opposing angle as compared to another slot. Ball slot 32F of tool holder 70A of FIG. 9 is angularly offset from longitudinal axis X at an acute angle α between the insertion direction 44 and the second working direction 88. Thus, ball slot 32F is complementary to ball slot 32E of FIGS. 8A-8F in that it is offset by an equal angle in the opposite direction. Such an opposed ball slot can be incorporated into any of the tool holder embodiments to allow for driving in working rotational direction 88.

Typical figures for a small to medium tool holder 10, 50, 70 are disclosed below. Dimensions and angles may be outside the disclosed ranges. It is to be understood that the disclosed apparatus can be scaled up or down for specific applications. A diameter of shaft bore 12 is typically in the range of 0.0625 inch to 0.5 inch. An angle of ramp 40 relative to longitudinal axis X is typically in the range of 3 to 15 degrees; a range of 7 to 10 degrees is particularly suitable. A typical offset angle α between a ball slot axis B and longitudinal axis X is in the range of 15 to 45 degrees; an angle α of 30 degrees is particularly suitable. A typical diameter for ball 34 is in the range of 0.125 inch to 0.375 inch; a diameter of 0.1875 inch is particularly suitable. A typical spring rate for spring 36 is in the range of 1 to 3 pounds.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An apparatus for holding a shaft of an object, wherein the shaft rotates in a first working direction, the apparatus comprising:
    a bore into which the shaft is inserted in an insertion direction, the bore having a longitudinal axis;
    a first ball slot in communication with the bore, the ball slot having a first axis that is angularly offset from the longitudinal axis at an acute angle between the insertion direction and the first working direction, the first ball slot further comprising a ramp;
    a first ball disposed within the first ball slot; and
    a spring, wherein upon insertion of the shaft into the bore, the shaft contacts the first ball and causes the first ball to move along the ramp within the first ball slot, thereby compressing the spring by a first amount.

2. The apparatus of claim 1 comprising a plurality of ball slots and an equal number of cooperating balls, wherein the first ball slot is one of the plurality of ball slots, and wherein the first ball is one of the cooperating balls.

3. The apparatus of claim 1 wherein the bore is disposed at least partially in a first bushing, and wherein the first bushing is held on a spindle by a removable nut.

4. The apparatus of claim 3 further comprising a second bushing that is interchangeable with the first bushing, the second bushing having a bore diameter different than a bore diameter of the first bushing.

5. The apparatus of claim 3 wherein the spring is disposed in an area between the bushing, spindle and nut.

6. The apparatus of claim 3 wherein the ramp is disposed on the nut.

7. The apparatus of claim 1 wherein the spring is disposed in the first ball slot.

8. The apparatus of claim 1 wherein a compression axis of the spring is substantially parallel to the first ball slot axis.

9. The apparatus of claim 1 wherein a compression axis of the spring is substantially parallel to the longitudinal axis.

10. The apparatus of claim 1 wherein the first ball slot is disposed at least partially in a spindle.

11. The apparatus of claim 10 wherein the ramp is disposed on a sleeve fixed to the spindle.

12. The apparatus of claim 1 further comprising a release member having a surface that further compresses the spring by a second amount in addition to the first amount, such that the first ball is removed from contact with the shaft.

13. The apparatus of claim 12 wherein the first ball slot is disposed at least partially in the release member.

14. The apparatus of claim 12 further comprising:
a spindle containing the bore; and
a spring retaining member disposed on the spindle;
wherein the spring is disposed between the release member, the spring retaining member and the spindle.

15. The apparatus of claim 1 wherein the spring is disposed in a spindle.

16. The apparatus of claim 1 wherein the spring is disposed between a spindle and a sleeve attached to the spindle.

17. The apparatus of claim 1 wherein the shaft rotates in a second working direction opposite the first working direction, the apparatus further comprising:
a second ball slot in communication with the bore, the second ball slot having a second axis that is angularly offset from the longitudinal axis at an acute angle between the insertion direction and the second working direction; and
a second ball disposed within the second ball slot.

18. The apparatus of claim 1 wherein the object is a tool bit.

* * * * *